(12) United States Patent
Paukner et al.

(10) Patent No.: US 11,193,411 B2
(45) Date of Patent: Dec. 7, 2021

(54) SYSTEM AND METHOD FOR EXHAUST GAS AFTERTREATMENT OF AN INTERNAL COMBUSTION ENGINE

(71) Applicant: Volkswagen AG, Wolfsburg (DE)

(72) Inventors: Stefan Paukner, Wolfsburg (DE); Falk-Christian Baron Von Ceumern-Lindenstjerna, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/774,361

(22) Filed: Jan. 28, 2020

(65) Prior Publication Data
US 2020/0157995 A1 May 21, 2020

Related U.S. Application Data

(63) Continuation of application No. PCT/EP2018/071602, filed on Aug. 9, 2018.

(30) Foreign Application Priority Data

Aug. 10, 2017 (DE) .......................... 102017118215.2

(51) Int. Cl.
*F01N 3/20* (2006.01)
*F01N 13/00* (2010.01)
(Continued)

(52) U.S. Cl.
CPC ....... *F01N 3/2033* (2013.01); *B01D 46/0027* (2013.01); *B01D 46/0063* (2013.01);
(Continued)

(58) Field of Classification Search
CPC ..... F01N 3/025; F01N 3/2033; F02D 41/0255
See application file for complete search history.

(56) References Cited

U.S. PATENT DOCUMENTS 8,464,522 B2   6/2013   Fujiwara et al.
2010/0192543 A1*  8/2010   Fujiwara ............... F02D 41/029
                                                  60/276
(Continued)

FOREIGN PATENT DOCUMENTS

CN   101868607 A   10/2010
CN   102733908 A   10/2012
(Continued)

OTHER PUBLICATIONS

German Search Report dated Apr. 13, 2018 for German Patent Application No. 102017118215.2, filed Aug. 10, 2017, 10 pages.
(Continued)

*Primary Examiner* — Laert Dounis
(74) *Attorney, Agent, or Firm* — Pearl Cohen Zedek Latzer Baratz LLP

(57) ABSTRACT

An exhaust gas aftertreatment system for an internal combustion engine charged by an exhaust gas turbocharger and spark-ignited by means of spark plugs has a particulate filter and a first three-way catalytic converter downstream from the particulate filter in a position close to the engine in an exhaust gas system connected to an outlet of the internal combustion engine and another three-way catalytic converter arranged in the underbody position of the motor vehicle, downstream from the first three-way catalytic converter. An exhaust gas burner is active from the start of the engine, introducing hot exhaust gas into the exhaust gas system downstream from the particulate filter, in order to heat at least one of the three-way catalytic converts to a light-off temperature, as quickly as possible after the cold start, thereby allowing an efficient exhaust gas aftertreat-
(Continued)

ment. The exhaust gas burner can be switched off when at least one of the two three-way catalytic converters has reached its light-off temperature.

10 Claims, 2 Drawing Sheets

(51) Int. Cl.
*B01D 46/00* (2006.01)
*B01D 53/94* (2006.01)
*F01N 3/025* (2006.01)
*F01N 3/035* (2006.01)
*F01N 3/10* (2006.01)
*F01N 3/30* (2006.01)
*F01N 11/00* (2006.01)
*F01N 3/021* (2006.01)
*F01N 3/36* (2006.01)

(52) U.S. Cl.
CPC ......... *B01D 53/9454* (2013.01); *F01N 3/021* (2013.01); *F01N 3/025* (2013.01); *F01N 3/0253* (2013.01); *F01N 3/035* (2013.01); *F01N 3/101* (2013.01); *F01N 3/30* (2013.01); *F01N 3/36* (2013.01); *F01N 11/007* (2013.01); *F01N 13/0093* (2014.06); *F01N 2240/14* (2013.01); *F01N 2560/025* (2013.01); *Y02A 50/20* (2018.01); *Y02T 10/12* (2013.01); *Y02T 10/40* (2013.01)

(56) References Cited

U.S. PATENT DOCUMENTS

| | | | |
|---|---|---|---|
| 2011/0219752 A1* | 9/2011 | Gonze | ............... F01N 9/002 60/286 |
| 2012/0031072 A1* | 2/2012 | Gonze | ............... F01N 13/0097 60/273 |
| 2012/0247086 A1 | 10/2012 | Gonze et al. | |
| 2013/0129575 A1* | 5/2013 | Lewis | ............... B01D 53/9477 422/170 |

FOREIGN PATENT DOCUMENTS

| | | | | |
|---|---|---|---|---|
| DE | 102008036127 A1 | 2/2010 | | |
| DE | 102010046747 A1 | 3/2011 | | |
| DE | 102012204779 A1 | 10/2012 | | |
| DE | 102012011603 A1 | 12/2013 | | |
| DE | 102012021573 A1 * | 5/2014 | ............... | F23G 7/07 |
| DE | 102012021573 A1 | 5/2014 | | |
| DE | 102013003701 A1 * | 9/2014 | ............ | F01N 3/023 |
| DE | 102013003701 A1 | 9/2014 | | |
| EP | 2873823 A1 | 5/2015 | | |
| JP | H0533629 A | 4/1993 | | |
| JP | 2009215933 A * | 9/2009 | | |
| WO | 2019030315 A1 | 2/2019 | | |

OTHER PUBLICATIONS

International Search Report dated Oct. 9, 2018 for PCT/EP2018/071602, filed Aug. 9, 2018, 5 pages.
Office Action for Chinese Patent Application No. 2018800481807, dated Apr. 6, 2021.

* cited by examiner

SYSTEM AND METHOD FOR EXHAUST GAS AFTERTREATMENT OF AN INTERNAL COMBUSTION ENGINE

This application is a continuation of International Patent Application No. PCT/EP2018/071602, filed on Aug. 9, 2018 under the Patent Cooperation Treaty (PCT), which claims priority to German Patent Application No. 102017118215.2, filed on Aug. 10, 2017.

TECHNICAL FIELD

The invention relates to an exhaust gas aftertreatment system for an internal combustion engine and an exhaust gas aftertreatment method for an internal combustion engine.

BACKGROUND

The increasingly stricter exhaust gas legislation places high demands on vehicle manufacturers, which can be solved by taking appropriate measures to reduce engine-out emissions and by treating the exhaust gas accordingly. With the introduction of legislative level EU6, a limit for the number of particles is stipulated for gasoline engines, which in many cases makes the use of a gasoline particulate filter necessary. Such soot particles develop especially after a cold start of the internal combustion engine due to an incomplete combustion in combination with an over-stoichiometric combustion air ratio and cold cylinder walls during the cold start. The cold start phase is therefore decisive for compliance with the legally prescribed particle limits. Such a gasoline particulate filter is further clogged with soot when the vehicle is being operated. To ensure that the exhaust gas backpressure does not increase too much, this gasoline particulate filter must continuously or periodically be regenerated. The increase of the exhaust gas backpressure may lead to an increased consumption of the internal combustion engine, loss of performance and an impairment of the smoothness of operation, and even misfires. To carry out a thermal oxidation of the soot retained in the gasoline particulate filter with oxygen, a sufficiently high temperature level in combination with oxygen that is present in the exhaust gas system of the gasoline engine at the same time is required. Since modern gasoline engines are normally operated without an excess of oxygen and with a stoichiometric combustion air ratio ($\lambda=1$), additional measures are necessary. Possible measures include an increase in temperature by making an ignition angle adjustment, a temporary lean adjustment of the gasoline engine, the blowing of secondary air into the exhaust gas system or a combination of these measures. So far, the preferred measure is an ignition angle adjustment in the late direction in combination with a lean adjustment of the gasoline engine since this process does not require any additional components and is able to supply a sufficient amount of oxygen in most operating points of the gasoline engine.

Due to the good efficiencies of gasoline engines, a regeneration of a particulate filter in the underbody position is impossible in certain operating situations, which means that the regeneration of a particulate filter in the underbody position requires special driving cycles. Positioning the particulate filter close to the engine is advantageous as this results in higher exhaust gas temperatures on the particulate filter and facilitates the heating to a regeneration temperature. Another problem with particulate filters having a three-way catalytically active coating, so-called four-way catalytic converters, is the fact that the coating can show strong signs of aging so that an additional three-way catalytic converter close to the engine may be required for the conversion of the gaseous pollutants.

DE 10 2008 036 127 A1 teaches a method for the exhaust gas aftertreatment of an internal combustion engine, in the exhaust of which a particulate filter and a three-way catalytic converter are arranged. The particulate filter is, as the first component of the exhaust gas aftertreatment, arranged downstream from an outlet of the internal combustion engine. A three-way catalytic converter is arranged downstream from the particulate filter. The oxygen in the exhaust gas is increased for the regeneration of the particulate filter via a lambda control of the three-way catalytic converter.

DE 10 2010 046 747 A1 discloses an exhaust gas aftertreatment system for a gasoline engine and a method for an exhaust gas aftertreatment. A particulate filter is arranged downstream from a three-way catalytic converter, and a secondary air system can be provided for the regeneration of the soot particles retained in the particulate filter, which blows fresh air into the exhaust gas system downstream from the three-way catalytic converter and upstream from the particulate filter.

DE 10 2012 204 779 A1 describes an exhaust gas aftertreatment system for an internal combustion engine in which an electrically heatable three-way catalytic converter and a further three-way catalytic converter are arranged downstream from the electrically heatable three-way catalytic converter. Secondary air can be introduced into the exhaust gas system to reduce emissions.

DE 10 2012 011 603 A1 discloses an internal combustion engine with an exhaust gas system, wherein an HC adsorber is arranged in the exhaust gas system and a three-way catalytic converter is arranged downstream from the HC adsorber, wherein downstream from the HC adsorber and upstream from the three-way an exhaust gas burner is provided for the introduction of hot burner gases into the exhaust of the internal combustion engine in order to heat up the three-way catalytic converter.

The unburned hydrocarbons can be retained in the HC adsorber when the engine is started until the three-way catalytic converter or a catalytic converter close to the engine has reached the light-off temperature.

Furthermore, DE 10 2012 021 573 discloses an internal combustion engine with an exhaust gas system in which a three-way catalytic converter can be heated by means of an exhaust gas burner. A pre-catalytic converter is heated by the burner until the harmful exhaust gas components can be converted by the pre-catalytic converter and a main catalytic converter downstream from the pre-catalytic converter.

SUMMARY

An object of the invention is to ensure that a regeneration temperature of the particulate filter is reached in all driving cycles to improve the aging behavior of the exhaust gas aftertreatment system and overcome the disadvantages known from prior art.

According to the invention, this object is achieved by an exhaust gas aftertreatment system for an internal combustion engine with an exhaust gas system, which is connected to an outlet of the internal combustion engine. The exhaust gas system comprises an exhaust in which a particulate filter is arranged close to the engine in the direction of flow of an exhaust gas of the internal combustion engine through the exhaust as a first emission-reducing component. A first three-way catalytic converter is arranged downstream from the particulate filter and also in a position close to the engine, and another three-way catalytic converter is arranged downstream from the first three-way catalytic converter. A burner is provided downstream from the particulate filter with which hot exhaust gas is provided for heating at least one of the three-way catalytic converters in the exhaust gas system. In this connection, an arrangement of the exhaust gas aftertreatment components with an exhaust length of less than 80 cm, in particular less than 50 cm, particularly preferably less than 35 cm from an outlet of the internal combustion engine is to be understood as an arrangement of the particulate filter and the first three-way catalytic converter close to the engine. This facilitates an accelerated heating of the particulate filter and the first three-way catalytic converter, in particular after a cold start of the internal combustion engine. Due to the position of the particulate filter close to the engine, less heat is lost through the walls of the exhaust, which means that it is easier to reach an oxidation temperature of soot particles retained in the particulate filter, which is necessary for the regeneration of the particulate filter, compared to a particulate filter in the underbody position of the internal combustion engine. The exhaust gas burner allows a large amount of energy to be introduced into the exhaust gas system whereby at least one of the three-way catalytic converters reaches its light-off temperature promptly after a cold start and thus facilitates an efficient conversion of pollutants.

This enables the three-way catalytic converter to heat up much more quickly than with an electric heating element, which means that the three-way catalytic converter reaches its light-off temperature faster.

The features listed in the dependent claims are advantageous improvements and developments of the exhaust aftertreatment system possible for an internal combustion engine according to the invention.

A preferred embodiment of the invention provides that the particulate filter is free from any coating, in particular free from a three-way catalytically active coating or a coating for the selective catalytic reduction of nitrogen oxides, and/or free from an oxygen reservoir, in particular free from a washcoat with oxygen storage capacity. This can prevent an aging-related change in the properties of the particulate filter so that the particulate filter has essentially the same behavior over the course of its lifetime. In addition, the function of the particulate filter and the heatable three-way catalytic converter can be monitored in this way by means of a pair of lambda sensors with the first lambda sensor being arranged upstream from the particulate filter and the second lambda sensor being arranged downstream from the electrically heatable three-way catalytic converter. Since the particulate filter is, as the first exhaust gas aftertreatment component, arranged behind the outlet of the internal combustion engine, the exhaust filter is subjected to high exhaust gas temperatures, in particular when the internal combustion engine is operating at full load, which otherwise leads to an increased thermal aging of a catalytic coating. In addition, fewer cells can be used by dispensing with a coating of the particulate filter, which causes the thermal mass of the particulate filter to be reduced and the heating of the particulate filter to be promoted. In addition, the exhaust gas backpressure is reduced as well, and as a result the flow losses in the exhaust gas system can be reduced and the efficiency of the internal combustion engine can be increased. This can be used to achieve a higher performance or reduced consumption under otherwise unchanged framework conditions. In addition, the thermal mass of the particulate filter can be reduced, the exhaust gas backpressure can be decreased and the ash storage capacity can be increased in this way compared to a coated particulate filter. The lower thermal mass and the position of the particulate filter close to the engine also make it easier to reach the regeneration temperature of the particulate filter.

According to a preferred and advantageous embodiment of the invention, the exhaust gas burner can be operated with a variable combustion air ratio. As a result, the exhaust gas burner can compensate for lambda fluctuations, in particular a substoichiometric lambda operation in the cold start phase of the internal combustion engine and thus ensure stoichiometric exhaust gas downstream from the inlet point for the hot burner gases of the exhaust gas burner.

It is particularly preferred if a stoichiometric exhaust gas is adjusted downstream from an inlet point of the exhaust gas burner. A stoichiometric exhaust gas allows for a particularly efficient exhaust gas aftertreatment at the three-way catalytic converters located downstream from the inlet point.

According to a preferred and advantageous embodiment of the invention, it is provided that the internal combustion engine comprises a secondary air system for introducing secondary air into the exhaust with an inlet point of the secondary air system being arranged at the outlet of the internal combustion engine or downstream from the outlet and upstream from the particulate filter. Secondary air is blown into the hot exhausts of the internal combustion engine, the unburned exhaust gas components reacting exothermically with the secondary air in the exhaust duct and thus ensuring that the exhaust gas heats up. The time it takes for the first three-way catalytic converter to reach its light-off temperature can thus be shortened even more. Furthermore, the secondary air system can be used to carry out a regeneration of the particulate filter and to introduce the oxygen necessary for the regeneration into the exhaust upstream from the particulate filter. As a result, the operating state of the internal combustion engine can be adapted accordingly when the particulate filter is regenerated so that the internal combustion engine does not have to be operated with an over-stoichiometric combustion air ratio in order to make a regeneration of the particulate filter possible.

In an advantageous improvement of the invention, an inlet point of the exhaust gases of the exhaust gas burner is formed downstream from the particulate filter and upstream from the first three-way catalytic converter. An inlet point downstream from the particulate filter and upstream from the first three-way catalytic converter near the engine enables the three-way catalytic converter to heat up particularly quickly to its light-off temperature since no further components need to be heated, and since, in particular, the particulate filter close to the engine does not have to be heated to reach the light-off temperature of the first three-way catalytic converter.

According to a preferred embodiment of the invention, a first lambda sensor is arranged upstream from the particulate filter, and a second lambda sensor is arranged in the exhaust downstream from the first three-way catalytic converter (close to the engine) and upstream from the second three-way catalytic converter. As a result, both the lambda control of the internal combustion engine and the on-board diagnosis of the heatable three-way catalytic converter can be carried out with a pair of lambda sensors since the uncoated particulate filter does not influence the lambda control. The first lambda sensor is preferably designed as a broadband lambda sensor in order to allow a quantitative statement about the oxygen content in the exhaust gas. The second lambda sensor may be designed as a switching-type lambda sensor in order to reduce costs and to provide a qualitative statement about an excess of oxygen in the exhaust gas.

Alternatively, the second lambda sensor may also be designed as a broadband sensor in order to allow for a qualitative control of the combustion air ratio of the exhaust burner.

According to a preferred embodiment of the invention, a first pressure sensor is arranged upstream from the particulate filter, and a second pressure sensor is arranged downstream from the particulate filter and preferably upstream from the first three-way catalytic converter. As a result, a differential pressure measurement can be carried out via the particulate filter with a pair of pressure sensors by means of which a loading state of the particulate filter can be determined. Regeneration of the particulate filter can thus be initiated on the basis of the pressure difference. In addition, an on-board diagnosis of the particulate filter can be carried out.

According to the invention, a method for the exhaust gas aftertreatment of an internal combustion engine with an exhaust gas aftertreatment system according to the invention is proposed, comprising the following steps:

Heating of at least one of the three-way catalytic converters to a light-off temperature by introducing hot exhaust gas from the exhaust gas burner into the exhaust gas system, Heating of the particulate filter, the first three-way catalytic converter and the second three-way catalytic converter with the exhaust gas flow of the internal combustion engine from the start-up of the internal combustion engine.

By means of a method according to the invention, at least one pollutant-reducing exhaust gas aftertreatment component, in particular the first three-way catalytic converter, can be heated to a light-off temperature promptly after a cold start of the internal combustion engine, thereby efficiently converting the harmful gaseous exhaust gas components. In addition, the aging resistance of the catalytic coating can be increased since the first three-way catalytic converter does not become as hot during the full-load operation of the internal combustion engine as the particulate filter arranged in the first position after the outlet. Furthermore, the regeneration of the particulate filter is facilitated by the arrangement close to the engine, and the disadvantages of a catalytic coating on the particulate filter are avoided.

In a preferred embodiment of the method for the exhaust gas aftertreatment, secondary air is introduced into the exhaust-side cylinder head or into the exhaust downstream from the exhaust and upstream from the particulate filter during a heating phase of one of the three-way catalytic converters or the particulate filter in order to assist the heating of the catalytic converters or the particulate filter by means of an exothermic conversion of unburned fuel components. By blowing in secondary air, the heat input from the hot exhaust gases of the exhaust gas burner can be supported since the exothermic reaction in the exhaust generates additional heat, which can be used to heat up the three-way catalytic converters and the particulate filter.

Unless otherwise stated in an individual case, the various embodiments of the invention mentioned in this application can advantageously be combined with one another.

BRIEF DESCRIPTION OF THE DRAWINGS

The invention is explained below in exemplary embodiments based on the associated drawings. The same components or components with the same are identified in the different figures with the same reference signs. In the accompanying drawings.

DETAILED DESCRIPTION

Figure 1:
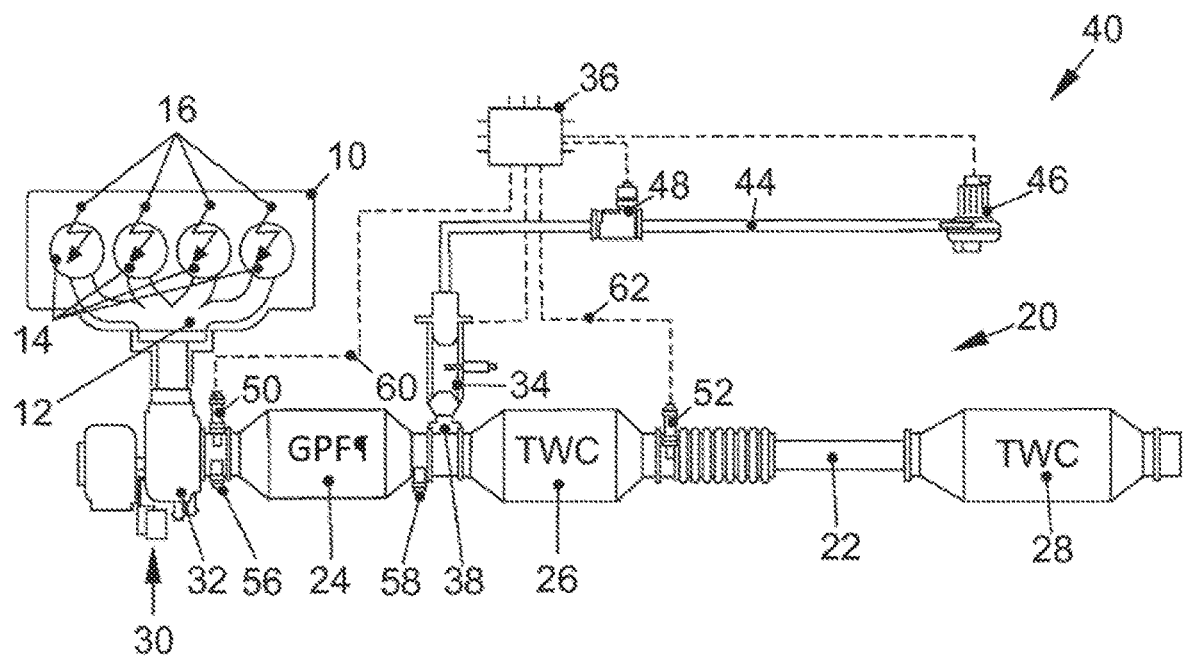
FIG. 1 shows a first embodiment of an internal combustion engine with an exhaust aftertreatment system according to the invention.

FIG. 1 shows a schematic illustration of an internal combustion engine 10, the outlet 12 of which is connected to an exhaust gas system 20. The internal combustion engine 10 is designed as a gasoline engine, which is spark-ignited by means of spark plugs 16 and which comprises a plurality of combustion chambers 14. The internal combustion engine 10 is preferably designed as an internal combustion engine 10 charged by means of an exhaust gas turbocharger 30, a turbine 32 of the exhaust gas turbocharger 30 being arranged downstream from the outlet 12 and upstream from the first emission-reducing exhaust gas aftertreatment component, in particular upstream from a particulate filter 24. The exhaust gas system 20 comprises an exhaust 22, in which a particulate filter 24 is arranged in the direction of flow of an exhaust gas through the exhaust 22 in which a first three-way catalytic converter 26 is arranged downstream from the particulate filter 24 and in which a second three-way catalytic converter 28 is arranged further downstream. The particulate filter 24 and the first three-way catalytic converter 26 are preferably all arranged close to the engine, that is to say at a distance of less than 80 cm exhaust length, in particular less than 50 cm exhaust length, from the outlet 12 of the internal combustion engine 10. The second three-way catalytic converter 28 is preferably arranged in the underbody position of a motor vehicle and thus in a position that is far from the engine, that is to say at a distance of more than 100 cm exhaust length from the outlet 12 of the internal combustion engine. Downstream from the particulate filter 24 and upstream from the first three-way catalytic converter 26 there is an inlet point 38 for hot exhaust gases from an exhaust gas burner 34, by means of which the first three-way catalytic converter 26 arranged downstream from the inlet point 38 can be heated up independently of the operating situation of the internal combustion engine 10.

Additional catalytic converters, in particular a further three-way catalytic converter, a NOx storage catalytic converter or a catalytic converter for the selective catalytic reduction of nitrogen oxides, may additionally be arranged in the exhaust gas system 20. A first lambda sensor 50 is arranged upstream from the particulate filter 24 in the exhaust 22 and can be used to determine the oxygen content $\lambda_1$ of the exhaust gas downstream from the outlet 12 and upstream from the first exhaust gas aftertreatment component, i.e. the particulate filter 24. Downstream from the first three-way catalytic converter 26 and upstream from the second three-way catalytic converter 28, a second lambda sensor 52 is arranged in the exhaust 22, by means of which the oxygen content $\lambda_2$ in the exhaust 28 downstream from the first three-way catalytic converter 26 and upstream from the second three-way catalytic converter 28 can be determined. The first lambda sensor 50 is preferably designed as a broadband lambda sensor and connected to a control unit 36 of the internal combustion engine 10 via a first signal line 60. The second lambda sensor 52 is preferably designed as a switching-type sensor and is connected to the control unit 36 via a second signal line 62. The first lambda sensor 50 and the second lambda sensor 52 form a sensor arrangement with which the combustion air ratio A of the internal combustion engine 10 can be regulated. In addition, an on-board diagnosis of the first three-way catalytic converter 26 can take place via the sensor arrangement.

The exhaust gas burner 34 can be supplied with fresh air via a secondary air system 40 and with a fuel via the fuel system of the internal combustion engine 10 or a separate fuel pump. The secondary air system 40 comprises a secondary air pump 46, which is connected to the exhaust gas burner 34 via a secondary air line 44. A secondary air valve 48 is arranged in the secondary air line 44, with which the air supply to the exhaust gas burner 34 can be created and prevented. Furthermore, pressure sensors 56, 58 are provided upstream and downstream from the particulate filter 24, with which a differential pressure measurement can be carried out via the particulate filter 24 to determine the loading state of the particulate filter 24. In addition, an on-board diagnosis of the particulate filter 24 can be carried out via the pressure sensors 56, 58.

Figure 2:
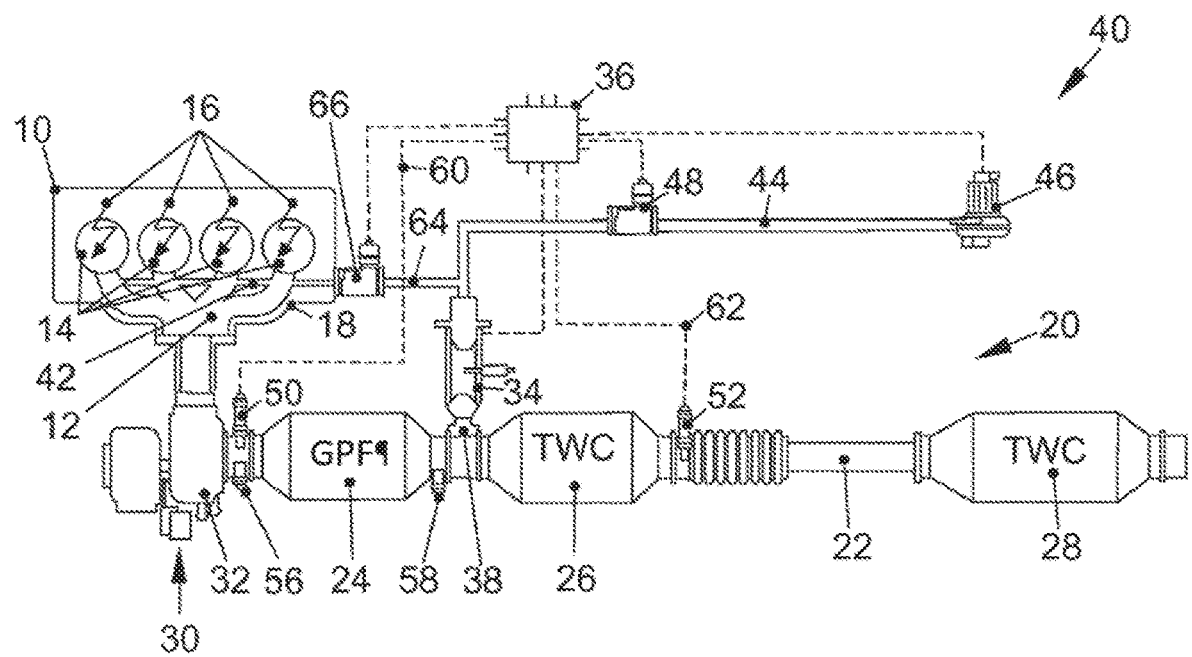
FIG. 2 shows another embodiment of an internal combustion engine with an exhaust gas aftertreatment system according to the invention, the exhaust gas aftertreatment system additionally having a secondary air system for introducing fresh air into the exhaust gas system.

FIG. 2 shows a further exemplary embodiment of an internal combustion engine with an exhaust gas aftertreatment system. With essentially the same assembly as shown in FIG. 1, the secondary air system 40 comprises an additional secondary air line 64, which connects the secondary air pump 46 with an inlet point 42 to a cylinder head 18 at the outlet side of the internal combustion engine 10. A further secondary air valve 66 is arranged in the additional secondary air line 64 in order to be able to introduce the secondary air into an exhaust gas which is as hot as possible and thus to promote exothermic reactions with unburned fuel components. Alternatively, the inlet point 42 can also be established at locations upstream from the particulate filter 24 so that the particulate filter 24 and the three-way catalytic converters 26, 28 arranged downstream from the particulate filter 24 can be supplied with secondary air.

When the internal combustion engine 10 is in operation, the exhaust gas of the internal combustion engine 10 is passed through the particulate filter 24, the first three-way catalytic converter 26 near the engine and the second three-way catalytic converter 28 in the underbody position, with the soot particles contained in the exhaust gas being filtered out of the exhaust gas stream and the harmful exhaust components being converted into harmless exhaust components. Due to the arrangement of the particulate filter 24 and the first three-way catalytic converter 26 close to the engine, a particularly fast heating to a light-off temperature is possible after a cold start of the internal combustion engine 10 in order to enable an efficient conversion of the gaseous pollutants as quickly as possible after the cold start. The particulate filter 24 is preferably uncoated, in particular without a coating with an oxygen storage capacity. This enables a diagnosis of the first three-way catalytic converter 26 via the lambda sensors 50, 52. The arrangement of the particulate filter 24 as the first component of the exhaust gas aftertreatment means that the first three-way catalytic converter 26 is not subjected to a high thermal load when the internal combustion engine 10 is operating at full load, which means that the aging of the catalytic coating of the first three-way catalytic converter 26 can be reduced.

Figure 3:
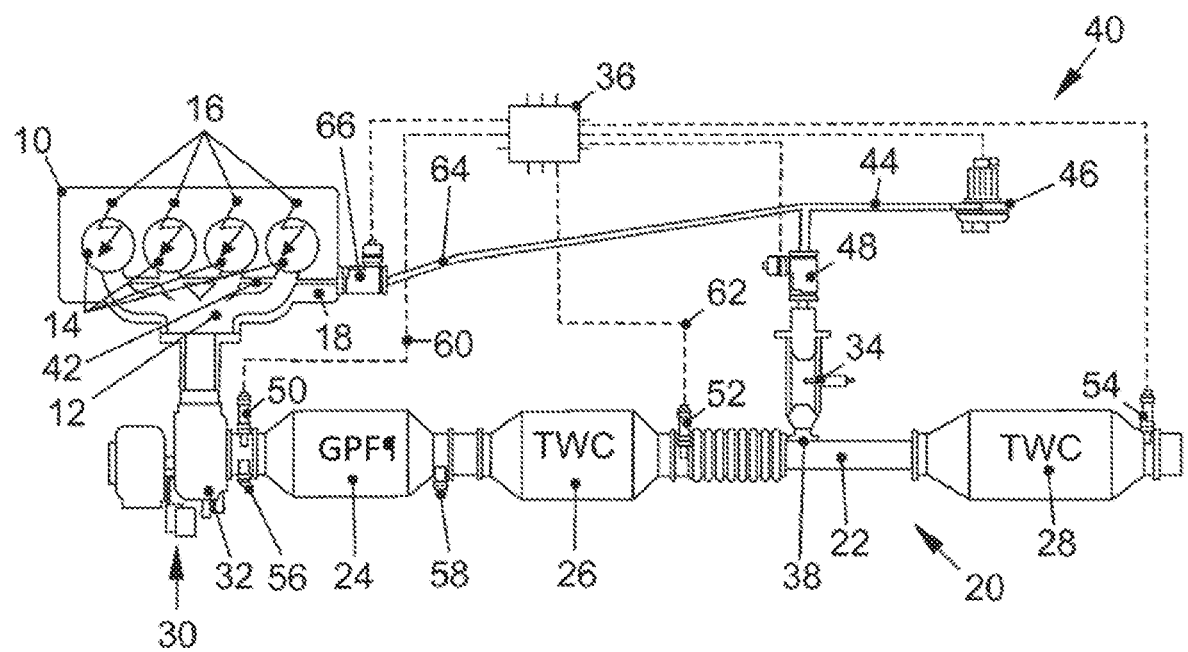
FIG. 3 shows another embodiment of an internal combustion engine with an exhaust gas aftertreatment system according to the invention, the exhaust gas burner being arranged downstream from the first three-way catalytic converter and upstream from the second three-way catalytic converter.

FIG. 3 shows a further exemplary embodiment of an internal combustion engine 10 according to the invention. Having essentially the same assembly as shown in FIG. 2, the inlet point 38 for the hot exhaust gases of the exhaust gas burner 34 is downstream from the first three-way catalytic converter 26 and upstream from the second three-way catalytic converter 28 in this exemplary embodiment. In addition, a third lambda sensor 54 is provided downstream from the second three-way catalytic converter 28 for regulating the combustion air ratio AB of the exhaust gas burner 34. In this embodiment, the second three-way catalytic converter 28 is heated by the exhaust gas burner 34 and thus reaches its light-off temperature $T_{LO}$ shortly after a cold start of the internal combustion engine 10. This embodiment is particularly useful in tight engine compartment configurations in which the arrangement of the exhaust gas burner 34 close to the engine is not possible or only with considerable additional effort for due to the lack of space.

Figure 4:
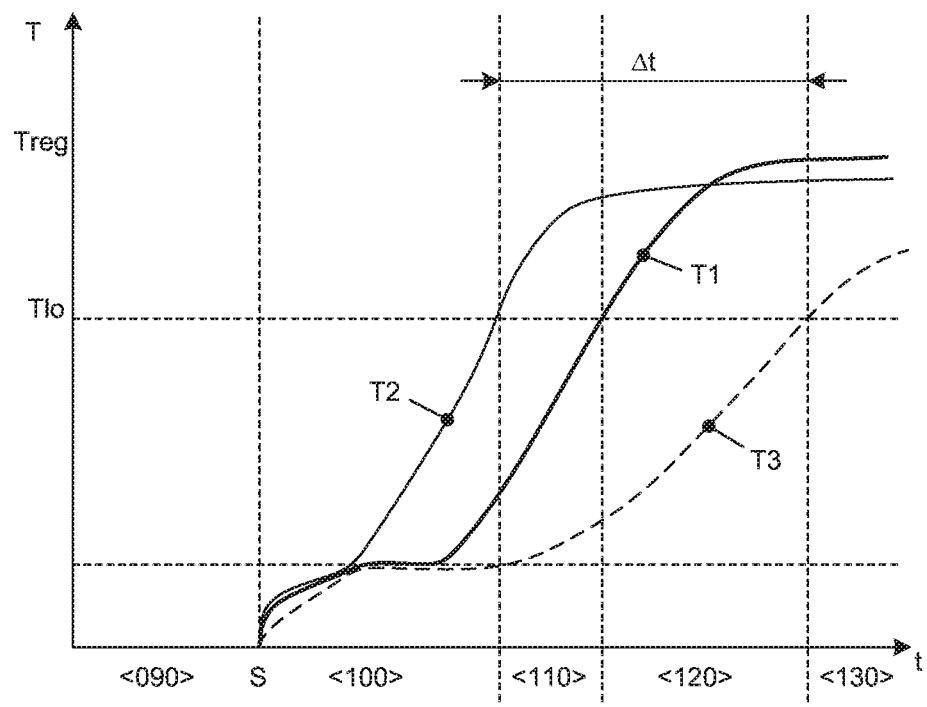
FIG. 4 shows a diagram which shows the temperature development in the exhaust gas system when the method for exhaust gas aftertreatment according to the invention is used.

FIG. 4 shows the temperature profile at several points in the exhaust gas system 20 when an exhaust gas aftertreatment method according to the invention is carried out. A first curve I shows the temperature T1 immediately downstream from the particulate filter 24. The second curve II shows the temperature T2 at the first three-way catalytic converter 26 with the exhaust gas burner 34 activated. The temperature T2 is determined at the center of the component of the first three-way catalytic converter 26. The internal combustion engine 10 is started at a starting time S, and the exhaust gas burner 34 is started at the same time. In a first phase <100>, the particulate filter 24 and the first three-way catalytic converter 26 are perfused by the exhaust gas of the internal combustion engine 10 and heated by the exhaust gas. In parallel, the first three-way catalytic converter 26 is heated by the hot exhaust gas of the exhaust gas burner 34, and the heat is transferred from the exhaust burner 34 to the first three-way catalytic converter 26 in a substantially convective manner. Once the first three-way catalytic converter 26 has reached its light-off temperature $T_{LO}$, a combined heating of the first three-way catalytic converter 26 occurs by means of heat from the exhaust gas burner 34 and, in a second phase <110>, by means of chemical heating since from this point in time the unburned exhaust gas components can be reacted exothermically on the catalytically active surface of the first three-way catalytic converter 26. Once the first three-way catalytic converter 26 has reached its operating temperature, the exhaust gas burner 34 is switched off. In a third phase <120>, the exhaust gas burner 34 is switched off, and the temperature of the first three-way catalytic converter 26 is maintained on the catalytically active surface of the first three-way catalytic converter 26 by the exothermic reactions of the unburned fuel components. In a fourth operating phase <130>, both the first three-way catalytic converter 26 and the particulate filter 24 have reached a temperature at which no further heating measures are necessary. For comparison purposes, the third curve shows the temperature T3 of the first three-way catalytic converter 26 when the exhaust gas burner 34 is not activated in any of the phases <100>, <110> and <120>.

Alternatively, the exhaust gas burner 34 can also be activated in a pre-start phase <90> so that the first catalytic converter 26 has already reached its light-off temperature $T_{LO}$ at the start S of the internal combustion engine 10 or so that the heating phase can be shortened again.

In summary, it can be said that an exhaust gas aftertreatment system according to the invention and the method according to the invention can ensure that a regeneration temperature of the particulate filter is reached in all driving cycles, and the aging behavior of the exhaust gas aftertreatment system is reduced.

LIST OF REFERENCE NUMERALS

10 Internal combustion engine
12 Outlet
14 Combustion chamber
16 Spark plug
18 Cylinder head
20 Exhaust gas system
22 Exhaust
24 Particulate filter
26 First three-way catalytic converter
28 Second three-way catalytic converter
30 Exhaust turbocharger
32 Turbine
34 Exhaust gas burner
36 Control unit
38 Inlet point
40 Secondary air system
42 Inlet point
44 Secondary air line
46 Secondary air pump
48 Secondary air valve
50 First lambda sensor/broadband sensor
52 Second lambda sensor/switching-type sensor
54 Third lambda sensor
56 First pressure sensor
58 Second pressure sensor
60 Signal line
62 Signal line
64 Secondary air line
66 Secondary air valve
<90> Pre-start phase
<100> Start phase of the internal combustion engine
<110> Second phase
<120> Third phase
<130> Fourth phase
S Start of the internal combustion engine
T Temperature
T1 Temperature
T2 Temperature on the first three-way catalytic converter with an active exhaust gas burner
T3 Temperature on the first three-way catalytic converter with a deactivated exhaust gas burner
$T_{LO}$ Light-off temperature of the electrically heated catalytic converter
$T_{REG}$ Regeneration temperature of the particulate filter

What is claimed is:

1. An exhaust gas aftertreatment system for an internal combustion engine with an exhaust gas system which is connected to an outlet of the internal combustion engine, the exhaust gas system including the exhaust gas aftertreatment system comprising:
    an exhaust in which a particulate filter in the direction of flow of an exhaust gas of the internal combustion engine through the exhaust is arranged as a first emission-reducing component close to the engine;
    a first three-way catalytic converter arranged downstream from the particulate filter in a position close to the engine;
    a second three-way catalytic converter arranged downstream from the first three-way catalytic converter; and
    an exhaust gas burner arranged downstream from the particulate filter, with which hot exhaust gas for heating at least one of the first or second three-way catalytic converter is introduced into the exhaust gas system.

2. The exhaust gas aftertreatment system according to claim 1, wherein the particulate filter is free from a coating and/or free from an oxygen store.

3. The exhaust gas aftertreatment system according to claim 1, wherein the exhaust gas burner is operated with a variable combustion air ratio.

4. The exhaust gas aftertreatment system according to claim 3, wherein the exhaust gas burner is configured to be operated to produce a stoichiometric exhaust gas downstream from an introduction point of the exhaust gas burner.

5. The exhaust gas aftertreatment system according to claim 1, wherein the internal combustion engine comprises a secondary air system for introducing secondary air into the exhaust, and wherein an introduction point of the secondary air system is arranged at the outlet of the internal combustion engine or downstream from the outlet and upstream from the particulate filter.

6. The exhaust gas aftertreatment system according to claim 1, wherein an inlet point of the exhaust gases of the exhaust gas burner is formed downstream from the particulate filter and upstream from the first three-way catalytic converter.

7. The exhaust gas aftertreatment system according to claim 1, wherein, in the exhaust, a first lambda sensor is arranged upstream from the particulate filter and a second lambda sensor is arranged downstream from the first three-way catalytic converter and upstream from the second three-way catalytic converter.

8. The exhaust gas aftertreatment system according to claim 1, wherein a first pressure sensor is arranged downstream from the particulate filter a second pressure sensor is arranged upstream from the particulate filter.

9. A method for exhaust gas aftertreatment of an internal combustion engine with an exhaust gas system comprising an exhaust in which a particulate filter in the direction of flow of an exhaust gas of the internal combustion engine through the exhaust is arranged as a first emission-reducing component close to the engine;
    a first three-way catalytic converter arranged downstream from the particulate filter in a position close to the engine;
    a second three-way catalytic converter arranged downstream from the first three-way catalytic converter; and
    an exhaust gas burner arranged downstream from the particulate filter, the method comprising:
    heating at least one of the first three-way catalytic converter or the second three-way catalytic converter in the exhaust gas system to a light-off temperature, by introducing hot exhaust gases from the exhaust gas burner into the exhaust gas system; and
    heating the particulate filter in the exhaust gas system, the first three-way catalytic converter and the second three-way catalytic converter with an exhaust gas flow of the internal combustion engine from a start of the internal combustion engine.

10. A The method for the exhaust gas aftertreatment according to claim 9, wherein during a heating phase of one of the first or second three-way catalytic converters or the particulate filter, secondary air is introduced into a cylinder head on an exhaust side or into an exhaust downstream from an outlet and upstream from the particulate filter to support heating of the first and second three-way catalytic converters or the particulate filter with an exothermic conversion of unburned fuel components.

\* \* \* \* \*